US012581349B2

(12) United States Patent
Lee

(10) Patent No.: US 12,581,349 B2
(45) Date of Patent: Mar. 17, 2026

(54) METHOD BY WHICH UPF NODE INCLUDING PLURALITY OF UPF INSTANCES PERFORMS QOS MONITORING, AND UPF NODE PERFORMING SAME METHOD

(71) Applicant: SK TELECOM CO., LTD., Seoul (KR)

(72) Inventor: Dong Jin Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 501 days.

(21) Appl. No.: 17/764,632

(22) PCT Filed: Oct. 27, 2020

(86) PCT No.: PCT/KR2020/014748
§ 371 (c)(1),
(2) Date: Mar. 29, 2022

(87) PCT Pub. No.: WO2021/085984
PCT Pub. Date: May 6, 2021

(65) Prior Publication Data
US 2022/0338052 A1 Oct. 20, 2022

(30) Foreign Application Priority Data
Oct. 30, 2019 (KR) ........................ 10-2019-0136822

(51) Int. Cl.
*H04W 28/02* (2009.01)
*H04L 41/06* (2022.01)
(Continued)

(52) U.S. Cl.
CPC ......... *H04W 28/0236* (2013.01); *H04L 41/06* (2013.01); *H04W 28/0268* (2013.01);
(Continued)

(58) Field of Classification Search
None
See application file for complete search history.

(56) References Cited

U.S. PATENT DOCUMENTS

2017/0289270 A1 10/2017 Li et al.
2019/0109823 A1* 4/2019 Qiao ..................... H04M 15/66
(Continued)

FOREIGN PATENT DOCUMENTS

JP 2011-244369 12/2011
KR 10-2021-0051487 5/2021
WO WO 2019/158093 8/2019

OTHER PUBLICATIONS

Indian Office Action dated Sep. 2, 2022 issued in Application No. 202217027594.
(Continued)

*Primary Examiner* — Adnan Baig
(74) *Attorney, Agent, or Firm* — KED & ASSOCIATES, LLP

(57) ABSTRACT

A method for performing quality of service (QoS) monitoring by a UPF node including a plurality of UPF instances according to an embodiment of the present disclosure, may comprise: receiving a subscription request for the plurality of UPF instances through a service-based interface from a network function node; performing the QoS monitoring for each of the plurality of UPF instances; and when an event occurs for at least one of the plurality of UPF instances according to a result of the QoS monitoring, transmitting a notification indicating that the event has occurred to the network function node through the service-based interface.

16 Claims, 8 Drawing Sheets

(51) Int. Cl.
  *H04W 28/24* (2009.01)
  *H04W 76/22* (2018.01)
  *H04W 80/10* (2009.01)

(52) U.S. Cl.
  CPC ........... *H04W 28/24* (2013.01); *H04W 76/22* (2018.02); *H04W 80/10* (2013.01)

(56) References Cited

U.S. PATENT DOCUMENTS

| | | | |
|---|---|---|---|
| 2019/0215730 A1 | 7/2019 | Qiao et al. | |
| 2019/0253917 A1 | 8/2019 | Dao | |
| 2020/0112907 A1* | 4/2020 | Dao | H04M 15/8016 |
| 2020/0260525 A1* | 8/2020 | Gan | H04W 80/10 |
| 2020/0364187 A1* | 11/2020 | Tran | G06N 3/02 |
| 2020/0374946 A1* | 11/2020 | Bedekar | H04W 76/12 |
| 2021/0211233 A1* | 7/2021 | Zhang | H04L 45/28 |
| 2021/0329485 A1* | 10/2021 | Han | H04W 28/0215 |
| 2022/0272008 A1* | 8/2022 | Pallares Del Egido | |
| | | | H04L 63/0263 |

OTHER PUBLICATIONS

CATT: "One Solution for Key Issue #2: Extend Service Concept into User Plane", 3GPP Draft; S2-187521_7448_WAS_6697_23742_SOL4KI#2_V1, 3$^{rd}$ Generation Partnership Project (3GPP), Mobile Competence Centre; 650, Route Des Lucioles; F-06921 Sophia-Antipolis Cedex; France, vol. SA WG2, No. Vilnius, Lithuania; Jul. 2, 2018-Jul. 6, 2018 Jul. 6, 2018 (Jul. 6, 2018), XP051538894.

"3$^{rd}$ Generation Partnership Project; Technical Specification Group Services and System Aspects; Study on UPF enhancement for Exposure and SBA (Release 18)", 3GPP Standard; Technical Report; 3GPP TR 23.700-62, 3$^{rd}$ Generation Partnership Project (3GPP), Mobile Competence Centre; 650, Route Des Lucioles; F-06921 Sophia-Antipolis Cedex; France, No. v2.1.0 Jan. 30, 2023 (Jan. 30, 2023, pp. 1-87, XP052235436.

European Search Report dated Aug. 29, 2023 issued in Application No. 20880999.6.

Chinese Office Action dated Sep. 19, 2023 issued in Application No. 202080076154.2.

International Search Report dated Jan. 26, 2021 issued in Application No. PCT/KR2020/014748.

Ericsson, UPF data collection, S2-1903302, 3GPP TSG-SA WG2 Meeting #132, Xi'an, China, Apr. 2, 2019.

Ericsson, Nupf eventexposure, S2-1901733, 3GPP TSG-SA WG2 Meeting #131, Santa Cruz, Tenerife, Spain, Feb. 19, 2019.

China Mobile, UPF service introduced in SBA, S2-187722, SA WG2 Meeting #128BIS, Sophia Antipolis, France, Aug. 14, 2018. 3GPP TS 23.501 v16.2.0 (Sep. 2019).

* cited by examiner

*FIG.6*

METHOD BY WHICH UPF NODE INCLUDING PLURALITY OF UPF INSTANCES PERFORMS QOS MONITORING, AND UPF NODE PERFORMING SAME METHOD

CROSS-REFERENCE TO RELATED PATENT APPLICATIONS

This application is a U.S. National Stage Application under 35 U.S.C. § 371 of PCT Application No. PCT/KR2020/014748, filed Oct. 27, 2020, which claims priority to Korean Patent Application No. 10-2019-0136822, filed Oct. 30, 2019, whose entire disclosures are hereby incorporated by reference.

TECHNICAL FIELD

The present disclosure relates to a method for performing QoS monitoring by a UPF node including a plurality of UPF instances, and a UPF node performing the same method.

BACKGROUND

As the types and the requested transmission speeds of the LTE communication service are diversified, an increase of the LTE frequency band and an evolution into the 5G communication system are actively progressed.

This rapidly evolving 5G communication system may accommodate the maximum number of terminals based on limited wireless resources, and furthermore support scenarios of eMBB (enhanced mobile broadband), mMTC (massive machine type communications), or URLLC (ultra-reliable and low latency communications).

In the 5G communication system, a network structure for supporting a terminal, a base station (access), a core and a server used as end to end device is defined, and a network structure is defined in which a control signaling functional area (or a control area) (Control Plane) and a data transmission/reception functional area (or a user area) (User Plane) are divided by separating the control signaling and the data transmission/reception functions that a single node (e.g., S-GW, P-GW) complexly performed in the previous LTE (4G).

In this case, various nodes are included in the control plane. For example, a AMF (Access and Mobility Function) that controls access to the wireless section of a terminal, a PCF (Policy Control Function) that manages/controls policies such as terminal information and subscription service information for each terminal, billing, etc., a SMF (Session Management Function) that manages or controls session for using data services for each terminal, and a NEF (Network Exposure Function) that is responsible for sharing information with an external network may be the examples.

In addition, the user plane may include things such as UPF.

SUMMARY

The problem to be solved in the present disclosure is to provide a method for performing QoS monitoring by a UPF node including a plurality of UPF instances.

However, the problem to be solved by the present disclosure is not limited to that mentioned above, and other problems to be solved that are not mentioned may be clearly understood by those of ordinary skill in the art to which the present disclosure belongs from the following description.

In accordance with an aspect of the present disclosure, there is provided a method for performing quality of service (QoS) monitoring by a UPF node including a plurality of UPF instances, the method comprise: receiving a subscription request for the plurality of UPF instances through a service-based interface from a network function node; performing the QoS monitoring for each of the plurality of UPF instances; and when an event occurs for at least one of the plurality of UPF instances according to a result of the QoS monitoring, transmitting a notification indicating that the event has occurred to the network function node through the service-based interface.

The service-based interface may be a Nupf interface provided by the UPF for direct communication with the network function node.

Each of the plurality of UPF instances may process at least one of a Packet Detection Rule (PDR), a Forwarding Action Rule (FAR), a QoS Enforcement Rule (QER), or a Usage Reporting Rule (URR).

The method may further comprise: performing QoS monitoring for a first UPF instance that processes a first PDU session among the plurality of UPF instances; and taking over the processing for the first PDU session to a second UPF instance based on a result of the QoS monitoring for the first UPF instance.

The taking over of the processing for the first PDU session to a second UPF instance may include determining a UPF instance to be taken over as the second UPF instance using at least one of pre-stored resource information, pre-stored capability information, or pre-stored state information of the second UPF instance.

The method may further comprise transmitting information on UPF instances to the Session Management Function (SMF) node, and the information on UPF instances may be used for the SMF node to select a UPF instance to process a PDU session from among the plurality of UPF instances.

The information on UPF instances may include at least one of ID, address, capacity, state, or communication interface information of the plurality of UPF instances.

The result of the QoS monitoring may include at least one of latency, throughput, or jitter of each of the plurality of UPF instances.

The each of the plurality of UPF instances may be separated by PDU session units.

The performing of the QoS monitoring for each of the plurality of UPF instances may comprise: performing QoS monitoring on a first UPF instance that processes a first traffic among the plurality of UPF instances; and performing QoS monitoring on a second UPF instance that processes a second traffic that replicated the first traffic among the plurality of UPF instances, and the method may further comprise determining whether to stop replication of the second UPF instance according to results of the QoS monitoring for the first UPF instance and the second UPF instance.

In accordance with another aspect of the present disclosure, there is provided a method for performing quality of service (QoS) monitoring by a UPF node including a plurality of UPF instances, the method comprise: receiving a request from a network function node to perform the QoS monitoring for the plurality of UPF instances through a Nupf interface; performing the QoS monitoring for each of the plurality of UPF instances according to the request; and transmitting a result of the QoS monitoring in response to the request. In accordance with another aspect of the present disclosure, there is provided a user plane function (UPF) node for performing a quality of service (QoS) monitoring comprise: a transceiver that sends and receives signals; a plurality of UPF instances; and a core controller that controls the transceiver and the plurality of UPF instances, wherein the core controller may be configured to: receive a subscription request for the plurality of UPF instances from a network function node through a service-based interface by controlling the transceiver; perform the QoS monitoring for each of the plurality of UPF instances; and when an event occurs for at least one of the plurality of UPF instances according to the result of the QoS monitoring, transmit a notification indicating that the event has occurred through the service-based interface by controlling the transceiver.

According to an embodiment of the present disclosure, by performing QoS monitoring in units of UPF instances, it is possible to provide a UPF instance suitable for a PDU session.

BRIEF DESCRIPTION OF THE DRAWINGS

FIG. 6 shows an example of a criterion for monitoring QoS in a UPF instance according to the embodiment of the present disclosure.

DETAILED DESCRIPTION

Advantages and features of the present disclosure, and methods for achieving them will become apparent with reference to embodiments described below in detail in conjunction with the accompanying drawings. However, the present disclosure is not limited to the embodiments disclosed below, but may be implemented in various different embodiments; and the embodiments disclosed herein are provided only to make the disclosure of the present disclosure complete, and only to enable those skilled in the art to fully understand the scope of the present disclosure; and the scope of the present disclosure is defined only by the claims.

In the description of embodiments according to the present disclosure, if it is determined that a detailed description of known functions or configurations may unnecessarily obscure the subject matters of the present disclosure, the detailed descriptions thereof will be omitted. In addition, terms to be described later are those defined in consideration of functions in the embodiments of the present disclosure, and may vary depending on the intention or practice of a user or operator. Therefore, the definition should be made based on the contents throughout this specification.

Figure 1:
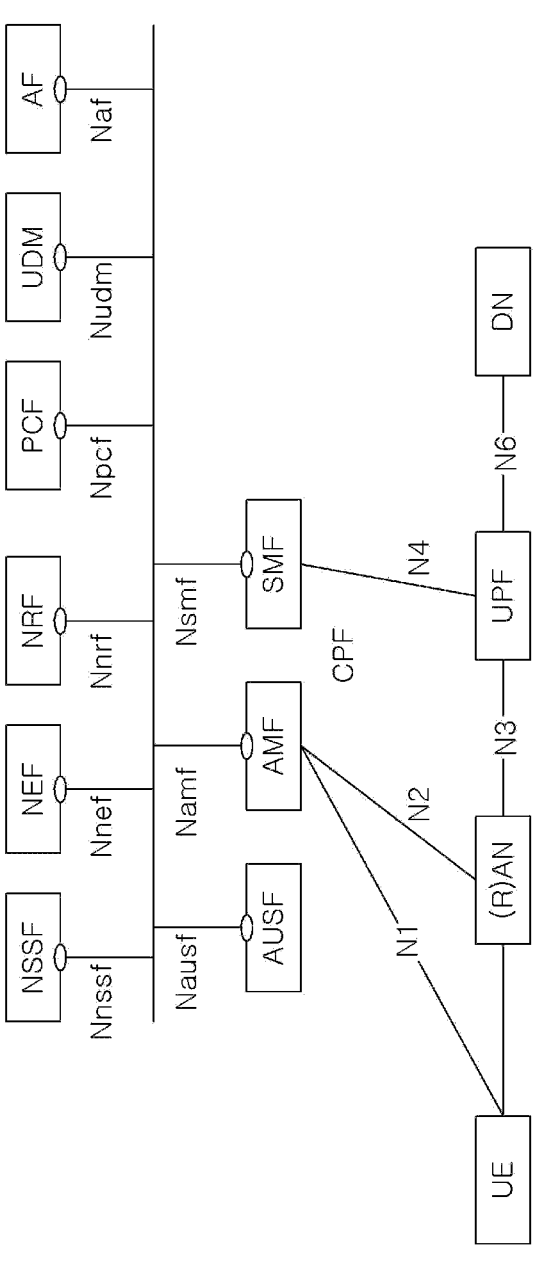
FIG. 1 is a block diagram conceptually illustrating an architecture of a conventional 5G communication system.

FIG. 1 is a block diagram conceptually illustrating an architecture of a conventional 5G communication system.

Referring to FIG. 1, the architecture of the 5G communication system may include various components (i.e., network functions (NF)), and as a part of them, FIG. 1 illustrates an Authentication Server Function (AUSF), (Core) Access and Mobility Management Function (AMF), Session Management Function (SMF), Policy Control Function (PCF), Application Function (AF), Unified Data Management (UDM), Data Network (DN), User Plane Function (UPF), Network Exposure Function (NEF), NF Repository Function (NRF), (Radio) Access Network ((R)AN) and User Equipment (UE).

The Control Plane Function (CPF) may include AUSF, PCF, AF, UDM, NEF, AMF and SMF. Network functions within the CPF node (e.g., AMF) may allow other authenticated network functions to access its service.

Each NF may support the following functions.

The AUSF may store data for authentication of the UE.

The AMF may provide a function for access and mobility management in units of the UE, and can be basically connected to one AMF per one UE. Specifically, AMF may support signaling between CN nodes for mobility between 3GPP access networks, a termination of a radio access network (RAN: Radio Access Network) CP interface (i.e., N2 interface), a termination of NAS signaling (Ni), a NAS signaling security (NAS ciphering and integrity protection), an AS security control, a registration management (Registration Area management), a connection management, an idle mode UE reachability (including control and enforcement of paging retransmission), a mobility management control (subscriptions and policies), supports of an intra-system mobility support and an inter-system mobility, a support of Network Slicing, an SMF selection, a Lawful Intercept (for AMF events and interface to LI systems), a provision of session management (SM) message delivery between UE and SMF, a Transparent proxy for SM message routing, an Access Authentication, an Access Authorization including roaming permission check, an SMS message delivery between UE and SMSF, a Security Anchor Function (SEA), a Security Context Management (SCM), etc.

Some or all functions of AMF may be supported within a single instance of one AMF.

DN may mean, for example, an operator service, an internet access, an IP Multimedia Subsystem (IMS), or a third party service.

PCF may provide the ability to decide policies such as a network slice policy, a QoS policy, and a session management. Specifically, PCF may support a unified policy framework to control a network operation, may provide policy rules so that CP function(s) (e.g., AMF, SMF, etc.) can enforce policy rules, and may support functions such as Front-End implementation for accessing related subscription information for policy decision in User Data Repository (UDR).

The SMF may provide session management function, and when the UE has a plurality of sessions, each of the plurality of sessions may be managed by a different SMF. Specifically, the SMF may support functions such as providing session management (e.g., session establishment, modification and release, including maintaining a tunnel between UPF and AN nodes), assignment and management of UE IP address (optionally including authentication), selection and control of UP functions, setting up traffic steering to route traffic to the appropriate destination in UPF, terminating interfaces towards policy control functions, enforcing the control portion of policies and QoS, Lawful Intercept (for SM events and interface to LI systems), terminating SM part of NAS message, Downlink Data Notification, initiator of AN specific SM information (to AN through N2 via AMF), determination on session SSC mode, and roaming function.

Some or all functions of SMF may be supported within a single instance of one SMF.

UDM may store user's subscription data, policy data, and the like. The UDM may include two parts, i.e., an application Front End (FE) and a User Data Repository (UDR).

The FE may include UDM FE responsible for location management, subscription management and credential processing, and PCF responsible for policy control. The UDR may store the data required for the functions provided by the UDM-FE and the policy profile required by the PCF. Data stored in the UDR may include user subscription data and policy data, including subscription identifiers, security credentials, access and mobility related subscription data, and session related subscription data. The UDM-FE can access subscription information stored in UDR and support functions such as Authentication Credential Processing, User Identification Handling, access authentication, registration/mobility management, subscription management, SMS management, etc.

The UPF may deliver the downlink PDU received from the DN to the UE via (R) AN, and may deliver the uplink PDU received from the UE via (R)AN to the DN. Specifically, the UPF may support functions such as an anchor point for intra/inter RAT mobility, an external PDU session point of interconnection to a data network, packet routing and forwarding, packet inspection and User plane part of policy rule enforcement, lawful intercept, traffic usage reporting, uplink classifier to support routing of traffic flow to data network, branching point for supporting multi-homed PDU session, QoS handling for the user plane (e.g., packet filtering, gating, uplink/downlink rate enforcement), uplink traffic verification (SDF mapping between Service Data Flow (SDF) and QoS flows), transport level packet marking within uplink and downlink, downlink packet buffering, and downlink data notification triggering.

Some or all functions of UPF may be supported within a single instance of one UPF.

AF may interact with the 3GPP core network to provide services (e.g., supporting functions such as application effect on traffic routing, Network Capability Exposure access, interaction with policy frameworks for policy control, etc.).

NEF may provide means to safely expose services and capabilities by 3GPP network functions, for example, 3rd party, internal exposure or re-exposure, application function, and Edge Computing. The NEF may receive information (based on the exposed capability(s) of other network function(s)) from other network function(s). NEF may store received information as structured data using standardized interfaces to data storage network functions. The stored information may be re-exposed to other network function(s) and application function(s) by the NEF and used for other purposes such as analysis.

The NRF may support service discovery function. It is possible to receive an NF discovery request from an NF instance, and provide information of the discovered NF instance to the NF instance. Further, it is possible to maintain available NF instances and the services they support.

(R)AN may collectively refer to a new radio access network that supports both of evolved E-UTRA (E-UTRA) which is an evolved version of 4G radio access technology, and New Radio (NR) access technology (e.g., gNB).

User Equipment (UE) may mean user device. The user equipment may be referred to in terms of a terminal, a mobile equipment (ME), a mobile station (MS), and the like. Further, the user device may be a portable device such as a laptop computer, a mobile phone, a personal digital assistant (PDA), a smart phone, a multimedia device, or the like, or may be a non-portable device such as a personal computer (PC) or in-vehicle device.

An unstructured data storage network function (UDSF) and a structured data storage network function (SDSF) are not shown in FIG. 1, but all NFs shown in FIG. 1 may perform interaction with UDSF and SDSF if necessary.

SDSF may be an optional function to support the functions of storing and retrieval of information as structured data by any NEF.

UDSF may be an optional function to support the functions of storage and retrieval of information as unstructured data by any NF.

The following exemplifies a service-based interface included in the 5G system architecture expressed as in FIG. 1.

Namf: Service-based interface exhibited by AMF
Nsmf: Service-based interface exhibited by SMF
Nnef: Service-based interface exhibited by NEF
Npcf: Service-based interface exhibited by PCF
Nudm: Service-based interface exhibited by UDM
Naf: Service-based interface exhibited by AF
Nnrf: Service-based interface exhibited by NRF
Nausf: Service-based interface exhibited by AUSF
Nupf: Service-based interface exhibited by UPF Further, in the 5G communication system, a conceptual link connecting NFs in the 5G communication system is defined as a reference point. The following illustrates the reference point included in the architecture of the 5G communication system.

N1 (or NG1): Reference point between UE and AMF
N2 (or NG2): Reference point between (R)AN and AMF
N3 (or NG3): Reference point between (R)AN and UPF
N4 (or NG4): Reference point between SMF and UPF
N5 (or NG5): Reference point between PCF and AF
N6 (or NG6): Reference point between UPF and the data network
N7 (or NG7): Reference point between SMF and PCF
N24 (or NG24): Reference point between the PCF in the visited network and the PCF in the home network
N8 (or NG8): Reference point between UDM and AMF
N9 (or NG9): Reference point between two core UPFs
N10 (or NG10): Reference point between UDM and SMF
N11 (or NG11): Reference point between AMF and SMF
N12 (or NG12): Reference point between AMF and AUSF
N13 (or NG13): Reference point between UDM and Authentication Server function (AUSF)
N14 (or NG14): Reference point between two AMFs
N15 (or NG15): Reference point between PCF and AMF in case of non-roaming scenarios, and reference point between PCF and AMF in visited network in case of roaming scenarios
N16 (or NG16): Reference point between two SMFs (reference point between SMF in visited network and SMF in home network in case of roaming scenarios)
N17 (or NG17): Reference point between AMF and EIR N18 (or NG18): Reference point between any NF and UDSF N19 (or NG19): Reference point between PSA UPF and PSA UPF FIG. 2 is a block diagram conceptually illustrating the architecture of the 5G communication system according to the embodiment of the present disclosure.

Figure 2:
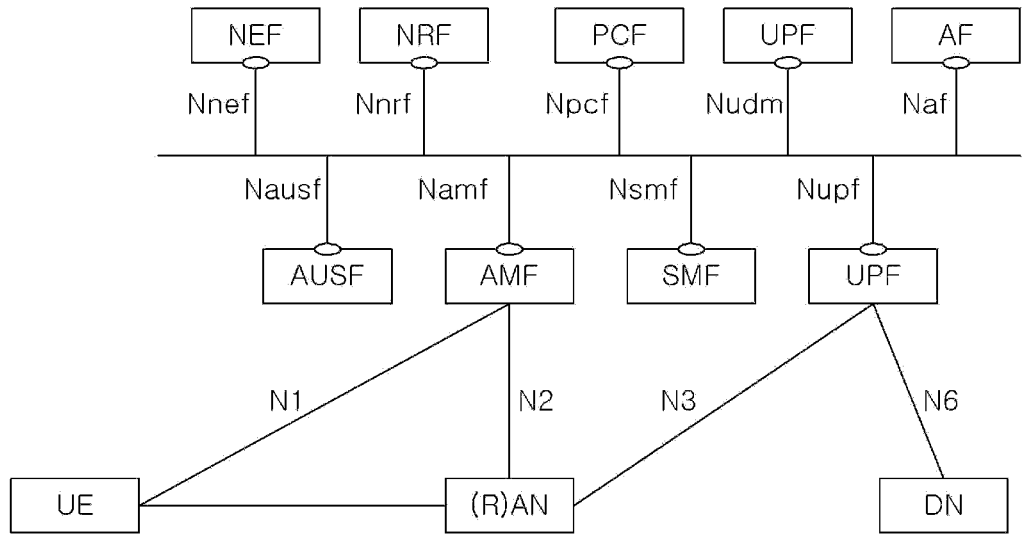
FIG. 2 is a block diagram conceptually illustrating an architecture of a 5G communication system according to an embodiment of the present disclosure.

Referring to FIG. 1 and FIG. 2, the conventional UPF is connected to the SMF through the N4 interface, and the UPF can transmit and receive data to and from other nodes only through the SMF.

In this disclosure, it is suggested a Nupf interface, which is a service-based interface that is exhibited by UPF for direct communication between UPF and other core network functions. In this case, the UPF can directly transmit and receive data to and from the network function nodes of the core network such as UDM and PCF through the Nupf interface without going through the SMF.

According to an embodiment, the UPF may be directly connected to other network function nodes such as PCF and UDM through the Nupf interface, and may be connected to a RAN, DN, etc. through an N3 interface, an N6 interface, etc. Therefore, when the UPF performs communication with other network function nodes using the Nupf interface, it may serve as a control plane, and when the UPF communicates with the RAN, DN, etc. through the N3 interface and N6 interface, it may serve as a user plane.

Figure 3A:
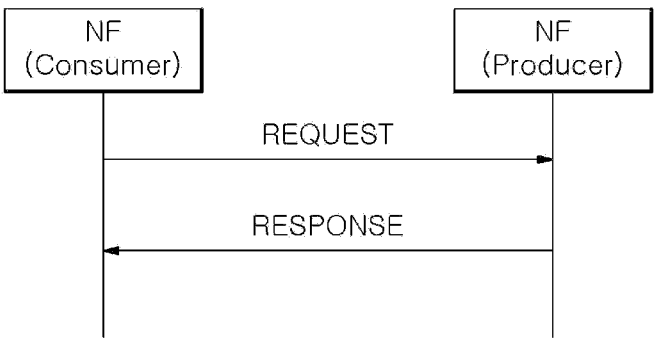
FIG. 3A is an exemplary conceptual diagram illustrating transmission of a request and a response between network function nodes according to the embodiment of the present disclosure.
Figure 3B:
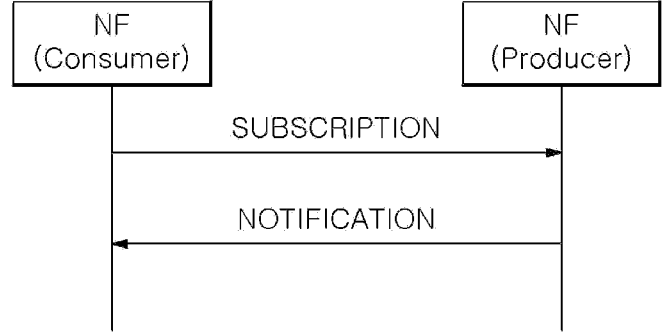
FIG. 3B is an exemplary conceptual diagram of subscription and notification being delivered between network function nodes according to the embodiment of the present disclosure.

FIG. 3A is an exemplary conceptual diagram illustrating transmission of a request and a response between network function nodes according to the embodiment of the present disclosure, and FIG. 3B is an exemplary conceptual diagram of subscription and notification being delivered between network function nodes according to the embodiment of the present disclosure.

Referring to FIGS. 3A and 3B, the UPF that receives the request message or subscription message may be referred to as an NF producer, and the NF that transmits the request message or subscription message may be referred to as an NF consumer.

Conventionally, since the NF consumer (e.g., PCF, NRF, NEF, UDM, etc.) was not directly connected to the UPF, but was connected through the SMF, the NF consumer sent a request message to the UPF through the SMF, and the UPF that received the request message sent a response message to the NF consumer as a response to the request message.

On the other hand, referring to FIG. 2 and FIG. 3A, since direct data communication may be performed between the NF consumer (PCF, NRF, NEF, UDM, etc.) and the UPF through the Nupf interface suggested in this disclosure, the NF consumer may send a request message for specific information, and the UPF that received the request message may send a response message directly to the NF consumer.

In addition, referring to FIG. 2 and FIG. 3B, since direct data communication is performed between the NF consumer and the UPF through the Nupf interface suggested in this disclosure, the NF consumer may request subscription to the UPF for specific information (e.g., information on usage), and the UPF that received the subscription request may notify the NF consumer for an event if the event for the specific information occurs (e.g., the usage exceeds a threshold value).

Figure 4:
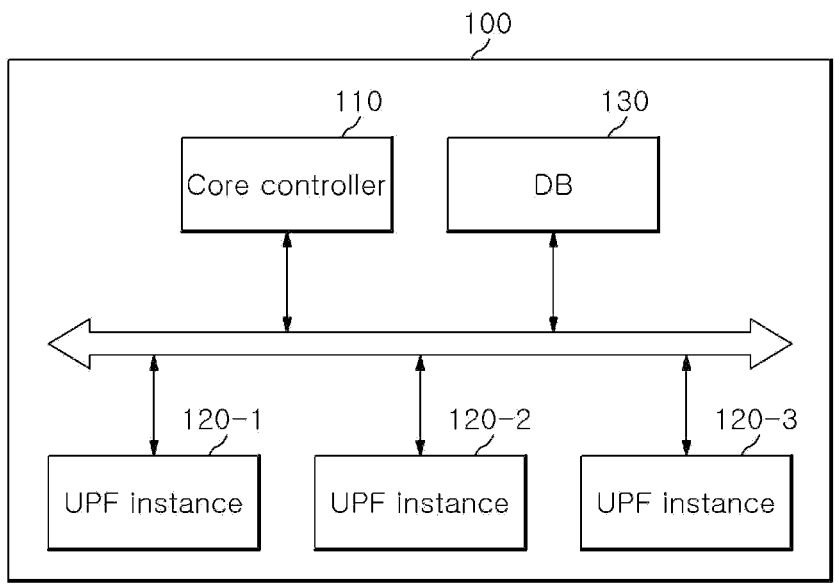
FIG. 4 is a block diagram illustrating a UPF according to the embodiment of the present disclosure.

FIG. 4 is a block diagram illustrating the UPF according to the embodiment of the present disclosure.

Referring to FIG. 4, the UPF 100 may include a core controller 110, a plurality of UPF instances 120-1, 120-2 and 120-3, a DB (Data Base, 130), and a transceiver (not shown).

In this disclosure, only three UPF instances are illustrated for convenience of description, but the present disclosure is not limited thereto. That is, the UPF 100 may include two or more UPF instances.

The UPF 100 may identify a packet and calculate or report a packet detection rule (PDR) for matching the identified packet with a specific processing rule, a forwarding action rule (FAR) for forwarding, deleting, buffering, or replicating the identified packet, gating and QoS control, QoS Enforcement Rule (QER) for providing flow and service level indication, and/or traffic processed in UPF, and may perform processing of Usage Reporting Rule (URR) for generating a report to enable the charging function in CPF.

According to an embodiment, the UPF 100 may be an intermediate UPF (I-UPF) or a PSA UPF.

The core controller 110 may control the overall operation of the UPF 100.

The core controller 110 may control/manage the functions of the UPF instances 120-1, 120-2, and 120-3 as a whole. The core controller 110 may monitor the quality of service (QoS) of the UPF instances 120-1, 120-2, and 120-3, and store information on the monitored QoS in the DB 130. The QoS information may include throughput, latency, and/or jitter of the UPF instance.

The core controller 110 may allocate resources independently for each UPF instance 120.

If a corresponding function cannot be properly performed, such as a failure or an overload occurs in any one of the UPF instances, the core controller 110 may take over a function performed by the corresponding UPF instance to another UPF instance by using the QoS information of the UPF instances 120-1, 120-2 and 120-3 stored in the DB.

The UPF instances 120-1, 120-2, and 120-3 (120 for representing them) may perform at least one of the functions of the UPF 100 (processing PDR, FAR, QER, URR, etc.). The amount of resources allocated to each UPF instance 120 may vary according to a function/rule performed by the UPF instance 120. For example, the first UPF instance 120-1 may process PDR, the second UPF instance 120-2 may process FAR, and the third UPF instance 120-3 may process QER.

Each UPF instance 120 may process a PDU session. That is, the unit processed by the UPF instance 120 may be a PDU session. For example, the first UPF instance 120-1 may process the PDR for the first PDU session, and the second UPF instance 120-2 may process the FAR for the second PDU session. According to an embodiment, the UPF instance 120 may process two or more PDU sessions.

Further, the PDU session may include at least one n-tuple flow, and according to an embodiment, QoS monitoring in the UPF instance 120 may be performed in units of n-tuple included in the PDU session.

According to an embodiment, the UPF instance may be a virtualized processor, or a physically existing hardware processor or server.

The DB 130 may store information on the UPF instance 120. The information on the UPF instance 120 may include information on the QoS.

The information on the UPF instance 120 may include information about the ID, address, capacity, resource (CPU, Memory, I/O, etc.) and/or state (Overload or Load) of each UPF instance 120.

The information on the UPF instance 120 may further include information about the type of communication interface, the speed of the communication interface, the delay of the communication interface and the load of the communication interface, for the UPF instance 120.

Information about the type of the communication interface may include a physical type of the communication interface (e.g., optical cable, copper cable, Wifi, etc.), a physical module (e.g., optical transceiver, RJ45 transceiver, etc.), physical port location (e.g., port 1, port 2, etc.), physical/logical combination information (e.g., a combination of 4 10 GbE LAN lines, active-standby/active-active redundancy structure, etc.) and/or logical identification information (e.g., Eth1, wlan1, br1, etc.).

Information on the speed of the communication interface may include a bandwidth (e.g., 1 Gb/s, 10 Gb/s, etc.), a transmission speed (e.g., throughput 10 Mb/s, 1 Gb/s, etc.), and a total speed of traffic being processed (e.g., a speed of total PDU session and total packet flow within the session), the number of sessions and flows being processed, the speed for each session and flow being processed (e.g., Session 1=20 Mb/s, Session 2=40 Mb/s, Flow 1=1 Mb/s, Flow 2=5 Mb/s), and/or usage per each session and flow being processed.

The information on the delay of the communication interface may include unidirectional and bidirectional delay values, unidirectional or bidirectional delay values for each session and flow, and unidirectional bidirectional data size types for each session and flow (e.g., 64, 512, 1500 bytes) and/or the type and the number of traffic data errors per each session and flow.

The information on the load of the communication interface may include resource load status information (e.g., CPU, Memory, Storage, etc.) in the UPF and other NFs related to interface processing, interface load status information connected in the UPF related to interface processing (e.g., N3, N6, N9 interfaces, etc.), interface load status information connected in SMF related to interface processing (e.g., Nsmf interface), and/or event status information about interface message types (e.g., PDR, QER, FAR, URR related to session creation, modification, or deletion).

ID, address, and capacity may be different for each UPF instance 120. Accordingly, the core controller 110 may identify the UPF instance 120 based on the ID or address of the UPF instance 120 stored in the DB 130, and determine whether to allocate a PDU session to be processed to the UPF instance 120 based on information on the UPF instance 120 stored in the DB 130. For example, if a specific UPF instance cannot operate due to a failure or if an overload occurs, the core controller 110 may select another UPF instance to process the PDU session that has been processed by the UPF instance based on the information on the UPF instance 120.

The core controller 110 may modify and delete the UPF instance 120, and may create a new UPF instance 120. According to an embodiment, the SMF may request the UPF 100 to add, modify, or delete the UPF instance 120, and the core network 110 of the UPF 100 may add, modify, or delete the UPF instance 120 according to the request of the SMF. Further, according to another embodiment, the core network 110 may add, modify, or delete the UPF instance 120 when it is determined that it is necessary to process the PDU session even if there is no request from the SMF.

The UPF instance 120 may directly transmit and receive data to/from a node such as AMF or PCF through the Nupf interface (or a conventional N4 interface).

The transceiver (not shown) may transmit information on the UPF instance 120 to SMF under the control of the core controller 110, and may transmit/receive information on the UPF instance 120 as a network function.

Figure 5:
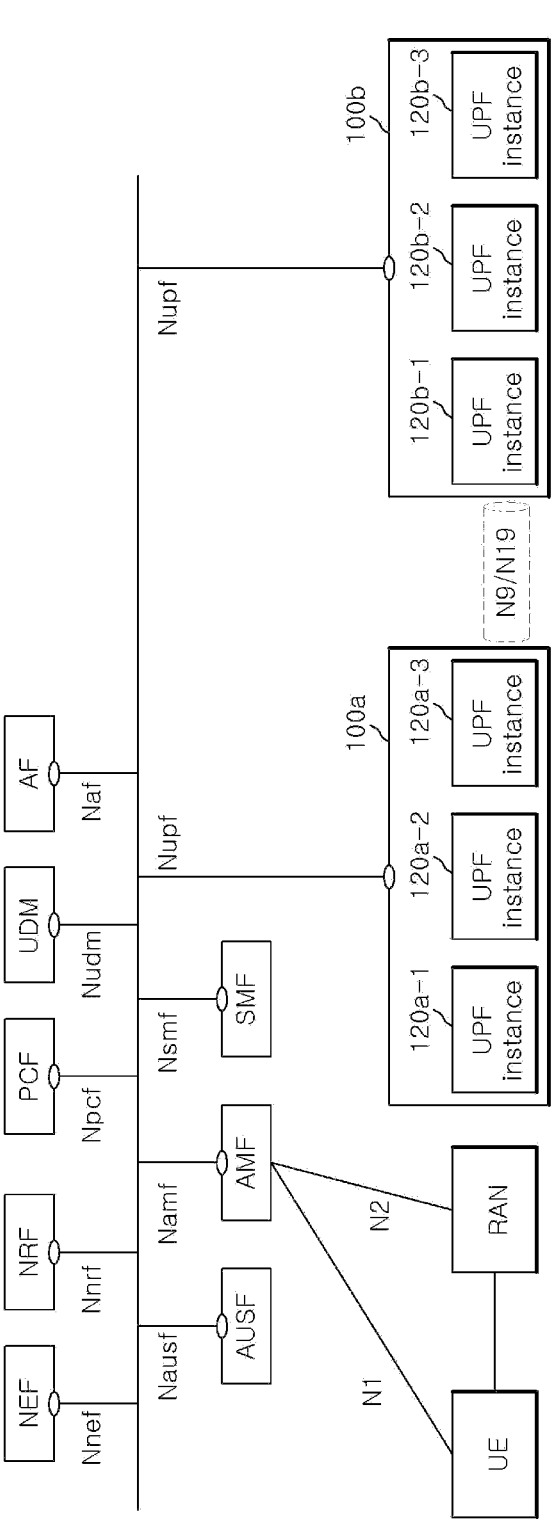
FIG. 5 is a block diagram conceptually illustrating an architecture of a 5G communication system including a plurality of UPFs according to the embodiment of the present disclosure.

FIG. 5 is a block diagram conceptually illustrating an architecture of the 5G communication system including a plurality of UPFs according to the embodiment of the present disclosure.

Referring to FIG. 5, the 5G communication system may include a plurality of UPFs 100a and 100b (representatively 100). Although only two UPFs are illustrated in FIG. 5 for convenience of explanation, the present disclosure is not limited thereto.

Each of the plurality of UPFs 100 may include a plurality of UPF instances. That is, as shown in FIG. 5, the first UPF 100a may include a plurality of UPF instances 120a-1, 120a-2, and 120a-3, and the second UPF 100b may include a plurality of UPF instances 120b-1, 120b-2, and 120b-3.

The SMF may receive information on each of the plurality of UPFs from each of the plurality of UPFs 100. Further, the SMF may receive information on the UPF instances 120 included in the UPF from each of the plurality of UPFs 100.

In the PDU session establishment process or in the PDU session modification process, the SMF may select a UPF to process the PDU session among the plurality of UPFs 100 based on the information about the UPF received from each of the plurality of UPFs 100. According to an embodiment, the SMF may select a UPF instance to process a PDU session based on information about the UPF received from each of the plurality of UPFs 100 from the UPF 100.

Further, according to an embodiment, in the PDU session establishment process or in the PDU session modification process, the PCF may also select a UPF to process the PDU session among the plurality of UPFs based on information about the UPF received from each of the plurality of UPFs 100. In this case, the PCF may select a UPF instance from among the UPFs.

The SMF may allocate a UPF instance for each PDU session. That is, each UPF instance may process one or more allocated PDU sessions.

The SMF may transmit information about the UPF received from each of the plurality of UPFs to the AMF, and the AMF may transmit the information about the received UPF to the terminal. Accordingly, the terminal and the AMF may identify information on each of the plurality of UPFs, and according to an embodiment, the terminal may select a UPF (or UPF instance) to process a PDU session using the received UPF information.

If the first UPF 100a and the second UPF 100b are PSA UPFs, the first UPF 100a and the second UPF 100b may be connected using an N19 interface. Here, the N19 interface may mean a reference point between the PSA UPF and the PSA UPF.

According to an embodiment, the 5G communication system may include a Group Management Function (GMF) (not shown) and/or a Path Management Function (PMF) (not shown).

Here, the GMF may be responsible for managing the 5GLAN group to create, modify, or remove the 5GLAN group according to the approved request of the terminal or the AF. Further, GMF may be responsible for authentication or authorization of the terminal for accessing a 5GLAN type service.

The PMF may support 5GLAN communication within a 5GLAN group and may be responsible for managing user plane paths to ensure the desired isolation. Further, during user plane management, the PMF may take into account the terminal location information and the DNAI information, and search for the PDU session information of the terminal received from the SMF.

Figure 6:
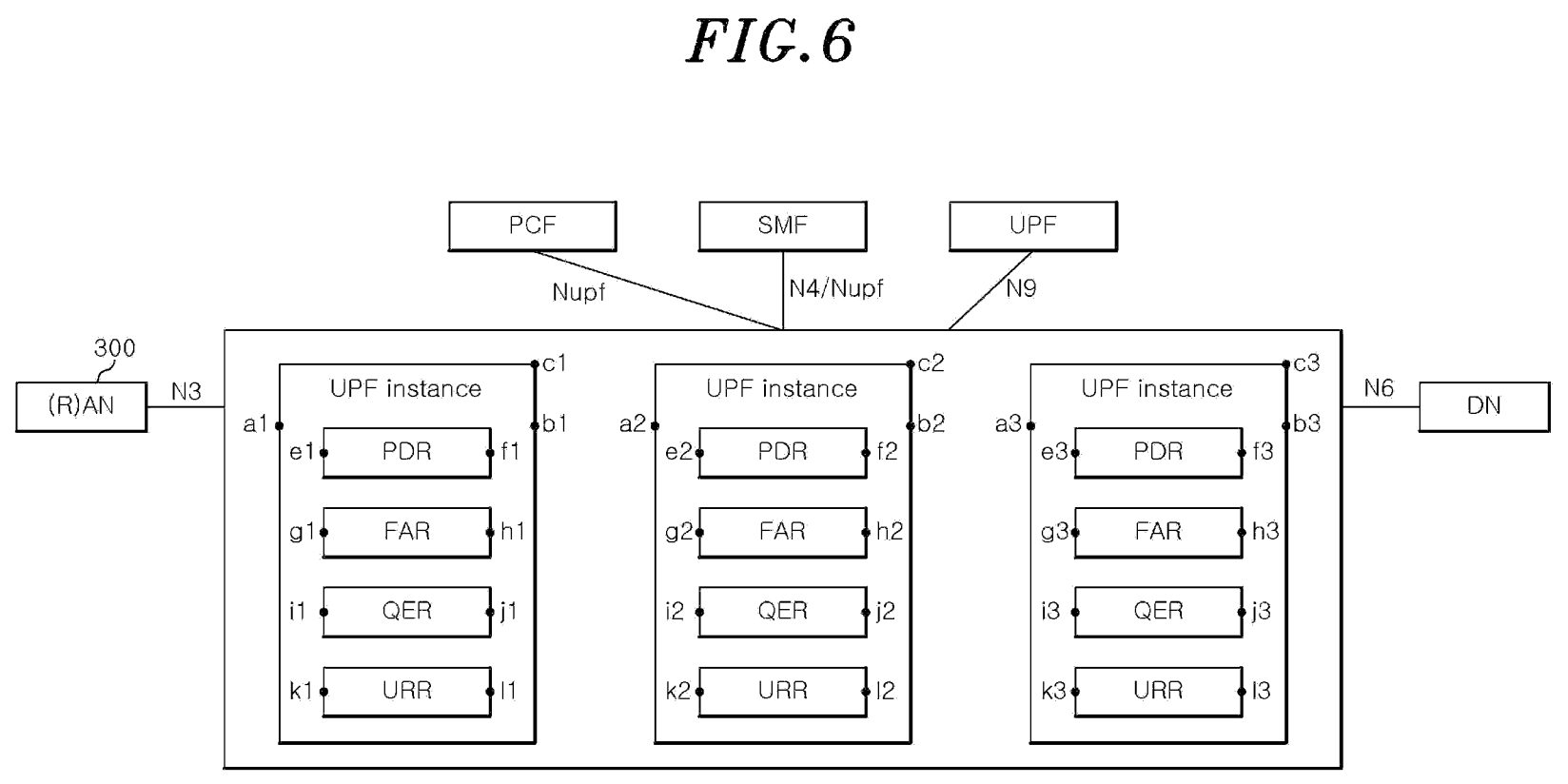

FIG. 6 shows an example of a criterion for monitoring QoS in the UPF instance according to the embodiment of the present disclosure Referring to FIG. 4 and FIG. 6, when performing QoS monitoring of the UPF instance, since the result may be different depending on the location where the QoS monitoring is performed, the core controller 110 may determine where to perform the QoS monitoring among the UPF instances 120.

A candidate group for a location for performing the QoS monitoring may be defined as follows. According to an embodiment, the location at which the QoS monitoring is performed may be different for each UPF instance.

The first ports (a1, a2, a3) of the UPF instance 120 used for input/output of the traffic to or from the base station 300

The second port (b1, b2, b3) of the UPF instance 120 used for input/output of the traffic to or from the DN The third port (c1, c2, c3) of the UPF instance 120 used for input/output of the traffic to or from other UPFs connected to the SMF A port of a module (e1, e2, e3, f1, f2, f3, g1, g2, g3, h1, h2, h3, i1, i2, i3, j1, j2, j3, k1, k2, k3, l1, l2, l3) provided to perform a predetermined function in the UPF instance 120

Here, the module provided to perform a predetermined function in the UPF instance 120 may mean any one of a module for processing PDR, a module for processing FAR, a module for processing QER, and a module for processing URR.

The followings are examples of locations for monitoring the QoS of the UPF instance 120.

(Example 1) If the time when traffic is processed in a specific module is measured, the measurement location may be designated as any one of the UPF instance 120 or each module (PDR, FAR, QER, URR) in the UPF instance 120. For example, if the measurement location is designated as the UPF instance 120, the time that the traffic is input to the first port (a1, a2, a3) and output to the second port (b1, b2, b3) may be measured as the latency. This is also the case when the measurement location is designated as any one of PDR, FAR, QER, or URR.

(Example 2) If the time is measured when traffic is processed by more than one module, the measurement location may be designated by more than one module. For example, if the measurement location is designated as PDR and FAR, the time that the traffic is input to the first port (a1, a2, a3), output to the sixth port (f1, f2, f3), then again input to the seventh port (g1, g2, The time from input to g3), and then output to the eighth port (h1, h2, h3) may be measured as the latency.

(Example 3) If the time when the traffic is transmitted between modules is measured, the measurement location may be UPF instances within different UPFs or UPF instances within the same UPF. For example, the time that the traffic is output from the third ports c1, c2, and c3, and then input to the fourth ports d1, d2, and d3 may be measured as the latency.

(Example 4) Transmission time of the traffic on a specific interface can be measured. For example, if the measurement location is designated as the first port (a1, a2, a3), the time that the traffic is output from the UPF instance 120 to the RAN through the first port (a1, a2, a3) and then input back to the UFP instance 120 from the RAN through the first port (a1, a2, a3), i.e., a round trip time, may be measured as the latency, and in this case, the traffic may be transmitted/received through the N3 interface. This is also the case when the measurement location is designated as the second port (b1, b2, b3), and in this case, the traffic may be transmitted/received through the N6 interface.

(Example 5) Examples 1 to 4 are examples of a case in which the time is measured based on one traffic. Differently, Examples 1 to 4 may be applied where a plurality of traffics, a flow consisting of a plurality of traffic, or a session consisting of a plurality of flows is used as a unit. For example, if the Example 1 is applied to a flow composed of a plurality of traffics, for all traffics constituting a specific flow, the time that the traffic is input to the first port (a1, a2, a3) and then output to the second port (b1, b2, b3) may be measured as the latency. Further, if the Example 2 is applied to a flow composed of a plurality of traffic, for all traffics constituting a specific flow, the time that the traffic is input to the first port (a1, a2, a3) and output to the sixth port (f1, f2, f3), and input to the seventh port (g1, g2, g3) and then output to the eighth port (h1, h2, h3) may be measured as the latency. Here, whether a plurality of traffics are input to or output from each port can be identified based on a (bidirectional) n-tuple or a field of each traffic.

Figure 7A:
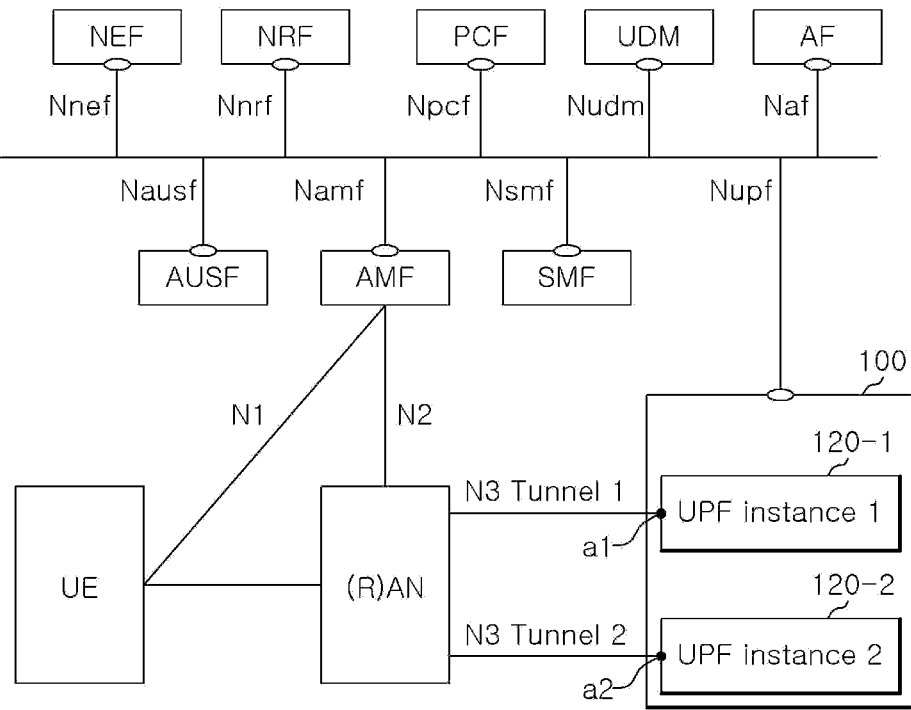
FIG. 7A shows an example of performing QoS monitoring in case that UPF instances are connected through tunnels separated from the RAN.
Figure 7B:
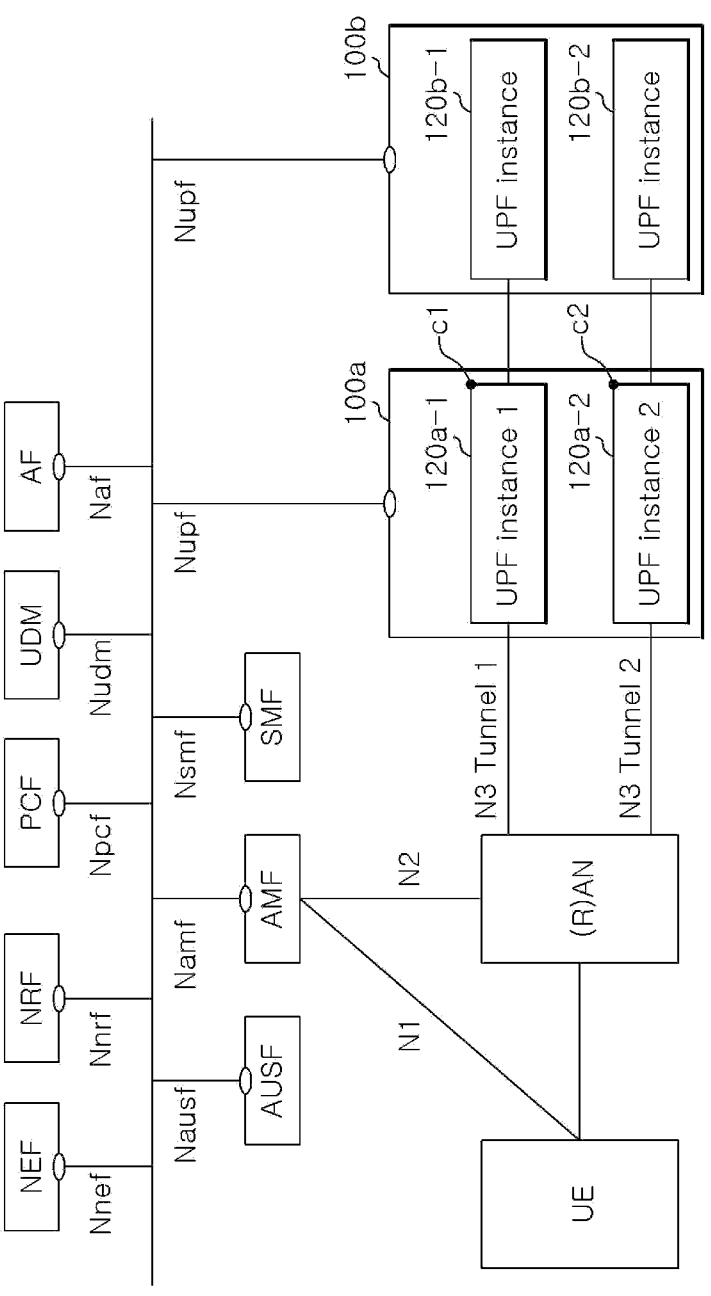
FIG. 7B shows an example of performing QoS monitoring in case that UPF instances of I-UPF and RAN are connected through respective tunnels, and UPF instances of PSA UPF and UPF instances of I-UPF are connected through respective tunnels.

FIG. 7A shows an example of performing QoS monitoring in case that UPF instances are connected through tunnels separated from the RAN, and FIG. 7B shows an example of performing QoS monitoring in case that UPF instances of I-UPF and RAN are connected through respective tunnels, and UPF instances of PSA UPF and UPF instances of I-UPF are connected through respective tunnels.

Referring to FIG. 6 and FIG. 7A, in order to safely transmit the traffic, the RAN may transmit the first traffic to the first UPF instance 120-1 through the first tunnel (N3 Tunnel 1), and transmit the second traffic that replicated the first traffic to the second UPF instance 120-2 through the second tunnel (N3 Tunnel 2). In this case, the UPF 100 may check whether the first traffic and the second traffic are replicated using the TEID and the sequence number at the receiving end. That is, the first traffic and the second traffic have different TEIDs because they are transmitted through different tunnels, but the GTP-U sequence numbers are the same since the first traffic and the second traffic are the same session, and the UPF may confirm that the first traffic and the second traffic are the same traffic (traffic replicated with each other) by verifying that the first traffic and the second traffic have different TEIDs and the GTP-U sequence number is the same.

The UPF 100 may perform the QoS monitoring for the first traffic and the second traffic. The UPF 100 may determine whether to replicate the traffic based on the result of the QoS monitoring. For example, the UPF 100 may recognize that the latency has increased (or the throughput has decreased) than before the replication as the result of the QoS monitoring, and the UPF 100 may request the RAN to stop the replication of the traffic according to the result of the QoS monitoring. That is, the UPF 100 may perform the QoS monitoring for each of the first UPF instance 120-1 and the second UPF instance 120-2, and as the result of the QoS monitoring, if the latency is increased compared to before the replication, the UPF 100 may request the RAN to stop the replication of the traffic.

According to an embodiment, the UPF 100 may perform the QoS monitoring at a first port a1 of the first UPF instance 120-1 and a first port a2 of the second UPF instance 120-2 used for input/output of the traffic from or to the RAN.

Referring to FIG. 6 and FIG. 7B, in order to safely transmit the traffic, the RAN may transmit the first traffic to the first UPF instance 120-1 through the first tunnel (N3 Tunnel 1), and transmit the second traffic that replicated the first traffic to the each UPF instance in the I-UPF through the second tunnel (N3 Tunnel 2). In this case, the I-UPF may transmit the first traffic and the second traffic to each UPF instance in the PSA UPF using a plurality of tunnels.

In this case, the I-UPF 100a may perform the QoS monitoring for the first traffic and the second traffic. The I-UPF 100a may determine whether to replicate the traffic based on the result of QoS monitoring. For example, as a result of QoS monitoring, the I-UPF 100a may recognize that the latency has been increased (or throughput has decreased) compared to before the replication, and the I-UPF 100a may request to the RAN (and I-UPF) to stop the replication of the traffic according to the QoS monitoring result. That is, the I-UPF 100a may perform the QoS monitoring for each of the first UPF instance 120a-1 and the second UPF instance 120a-2, and as a result of the QoS monitoring, if the latency is increased compared to before the replication, the I-UPF 100a may request to the RAN to stop the replication of the traffic.

According to an embodiment, the I-UPF 100a may perform the QoS monitoring at a third port c1 of the first UPF instance 120a-1 and a third port c2 of the second UPF instance 120a-2 used for input/output of the traffic from or to other UPFs connected to the SMF.

Meanwhile, each step included in the method for performing QoS monitoring according to an embodiment may be implemented in a computer-readable recording medium recording a computer program programmed to perform such steps.

On the other hand, each step included in the method for performing QoS monitoring according to the embodiment as described above may be implemented in a computer-readable recording medium recording a computer program programmed to perform such steps.

The above description is merely illustrative of the technical idea of the present disclosure, and various modifications and variations can be made by those skilled in the art to which the present disclosure pertains without departing from the essential quality of the present disclosure. Therefore, the embodiments disclosed herein are not intended to limit the technical spirit of the present disclosure, but to illustrate it, and the scope of the technical spirit of the present disclosure is not limited by these embodiments. The protection scope of the present disclosure should be interpreted by the following claims, and all technical ideas within the scope equivalent thereto should be interpreted as being included in the scope of the present disclosure.

What is claimed is:

1. A method for performing quality of service (QOS) monitoring by a user plane function (UPF) node including a plurality of UPF instances, comprising:

receiving a subscription request for the plurality of UPF instances through a service-based interface from a network function node;

performing the QoS monitoring for each of the plurality of UPF instances; and when an event occurs for at least one of the plurality of UPF instances according to a result of the QoS monitoring, transmitting a notification indicating that the event has occurred to the network function node through the service-based interface, wherein each of the plurality of UPF instances performs one or more respective functions of the UPF node based on independently allocated resources for each of the plurality of UPF instances, wherein each of the plurality of UPF instances processes at least one of a Packet Detection Rule (PDR), a Forwarding Action Rule (FAR), a QoS Enforcement Rule (QER), or a Usage Reporting Rule (URR), wherein the plurality of UPF instances include a first UPF instance that processes first traffic and a second UPF instance that processes second traffic, and wherein the method further comprises:

determining, based on performing the OS monitoring, when at least one of an increase in latency or a decrease in throughput occurs in the plurality of UPF instances;

determining when the second traffic replicates the first traffic; and when the at least one of the increase in latency or the decrease in throughput occurs in the plurality of UPF instances and the second traffic replicates the first traffic, stopping replication by the second UPF instance.

2. The method of claim 1, wherein the service-based interface is a Nupf interface provided by the UPF for direct communication with the network function node.

3. The method of claim 1, further comprising: performing QoS monitoring for a UPF instance that initially processes a first PDU session among the plurality of UPF instances; and taking over the processing for the first PDU session by a another UPF instance based on a result of the QoS monitoring for the UPF instance that initially processes the first PDU session.

4. The method of claim 3, wherein the taking over of the processing by the other UPF instance includes determining one of the UPF instances to be the other UPF instance using at least one of pre-stored resource information, pre-stored capability information, or pre-stored state information of the other UPF instance.

5. The method of claim 1, further comprising:

transmitting information on UPF instances to the Session Management Function (SMF) node, wherein the information on UPF instances is used for the SMF node to select a UPF instance to process a PDU session from among the plurality of UPF instances.

6. The method of claim 5, wherein the information on UPF instances includes at least one of ID, address, capacity, state, or communication interface information of the plurality of UPF instances.

7. The method of claim 1, wherein the result of the QoS monitoring includes at least one of latency, throughput, or jitter of each of the plurality of UPF instances.

8. The method of claim 1, wherein the each of the plurality of UPF instances is separated by PDU session units.

9. A method for performing quality of service (QOS) monitoring by a user plane function (UPF) node including a plurality of UPF instances, comprising receiving a request from a network function node to perform the QoS monitoring for the plurality of UPF instances through a Nupf interface, each of the plurality of UPF instances performing one or more respective functions of the UPF node based on independently allocated resources for each of the plurality of UPF instances; performing the QoS monitoring for each of the plurality of UPF instances according to the request; and transmitting a result of the QoS monitoring in response to the request, wherein each of the plurality of UPF instances processes at least one of a Packet Detection Rule (PDR), a Forwarding Action Rule (FAR), a QoS Enforcement Rule (QER), or a Usage Reporting Rule (URR), wherein the plurality of UPF instances include a first UPF instance that processes first traffic and a second UPF instance that processes second traffic, and wherein the method further comprises: determining, based on performing the QoS monitoring, when at least one of an increase in latency or a decrease in throughput occurs in the plurality of UPF instances; determining when the second traffic replicates the first traffic; and when the at least one of the increase in latency or the decrease in throughput occurs in the plurality of UPF instances and the second traffic replicates the first traffic, stopping replication by the second UPF instance.

10. The method of claim 9, further comprising:
performing QoS monitoring for a first UPF instance that processes a first PDU session among the plurality of UPF instances; and
taking over the processing for the first PDU session to a second UPF instance based on a result of the QoS monitoring for the first UPF instance.

11. The method of claim 9, wherein the result of the QoS monitoring includes at least one of latency, throughput, or jitter of each of the plurality of UPF instances.

12. A user plane function (UPF) node for performing a quality of service (QOS) monitoring, comprising: a transceiver that sends and receives signals; a plurality of UPF instances; and a core controller that controls the transceiver and the plurality of UPF instances; wherein the core controller is configured to: receive a subscription request for the plurality of UPF instances from a network function node through a service-based interface by controlling the transceiver; perform the QoS monitoring for each of the plurality of UPF instances; and when an event occurs for at least one of the plurality of UPF instances according to the result of the QoS monitoring, transmit a notification indicating that the event has occurred through the service-based interface by controlling the transceiver, wherein each of the plurality of UPF instances performs one or more respective functions of the UPF node based on independently allocated resources for each of the plurality of UPF instances, wherein each of the plurality of UPF instances processes at least one of a Packet Detection Rule (PDR), a Forwarding Action Rule (FAR), a QoS Enforcement Rule (QER), or a Usage Reporting Rule (URR), wherein the plurality of UPF instances include a first UPF instance that processes first traffic and a second UPF instance that processes second traffic, and wherein the core controller is configured to: determine, based on performing the QoS monitoring, when at least one of an increase in latency or a decrease in throughput occurs in the plurality of UPF instances; determine when the second traffic replicates the first traffic; and when the at least one of the increase in latency or the decrease in throughput occurs in the plurality of UPF instances and the second traffic replicates the first traffic, stop replication by the second UPF instance.

13. The UPF node of claim 12, wherein the service-based interface is a Nupf interface provided by UPF for direct communication with the network function node.

14. The UPF node of claim 12, wherein the core controller is configured to:
perform QoS monitoring for a first UPF instance that processes a first PDU session among the plurality of UPF instances, and
take over the processing for the first PDU session to a second UPF instance based on a result of the QoS monitoring for the first UPF instance.

15. The UPF node of claim 12,
wherein the core controller is configured to transmit information on UPF instances to the Session Management Function (SMF) node, and
wherein the information on UPF instances is used for the SMF node to select a UPF instance to process a PDU session from among the plurality of UPF instances.

16. The method of claim 1, further comprising determining that the second traffic replicates the first traffic when the first traffic and the second traffic have different tunnel endpoint identifiers (TEIDs) and a common GTP-U sequence number.

* * * * *